US009829694B2

(12) United States Patent
Okabe

(10) Patent No.: US 9,829,694 B2
(45) Date of Patent: Nov. 28, 2017

(54) MICROSCOPE SYSTEM

(71) Applicant: OLYMPUS CORPORATION, Tokyo (JP)

(72) Inventor: Masashi Okabe, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 107 days.

(21) Appl. No.: 14/539,005

(22) Filed: Nov. 12, 2014

(65) Prior Publication Data
US 2015/0145982 A1 May 28, 2015

(30) Foreign Application Priority Data

Nov. 28, 2013 (JP) ................................. 2013-246522

(51) Int. Cl.
| | | |
|---|---|---|
| G02B 21/00 | (2006.01) | |
| G02B 21/36 | (2006.01) | |
| G01J 3/00 | (2006.01) | |
| H04N 5/205 | (2006.01) | |
| G06T 5/00 | (2006.01) | |
| G01J 3/02 | (2006.01) | |
| G01J 3/28 | (2006.01) | |

(52) U.S. Cl.
CPC .............. *G02B 21/365* (2013.01); *G01J 3/00* (2013.01); *G01J 3/027* (2013.01); *G06T 5/009* (2013.01); *H04N 5/205* (2013.01); *G01J 2003/2826* (2013.01); *G06T 2207/10024* (2013.01); *G06T 2207/10056* (2013.01)

(58) Field of Classification Search
CPC ........... G02B 21/365; G01J 3/00; G06T 5/009
USPC .......................................................... 348/80
See application file for complete search history.

(56) References Cited

U.S. PATENT DOCUMENTS

| | | | | |
|---|---|---|---|---|
| 6,876,399 B1 * | 4/2005 | Masuyama | .......... | G02B 21/361 348/557 |
| 2004/0004695 A1 * | 1/2004 | Sugino | .................. | A61B 3/145 351/206 |

FOREIGN PATENT DOCUMENTS

| | | |
|---|---|---|
| JP | 2004-086031 A | 3/2004 |
| JP | 2010-098719 A | 4/2010 |

OTHER PUBLICATIONS

Japanese Office Action dated Apr. 25, 2017 in Japanese Patent Application No. 2013-246522.

* cited by examiner

*Primary Examiner* — Jeffery Williams
(74) *Attorney, Agent, or Firm* — Scully, Scott, Murphy & Presser, P.C.

(57) ABSTRACT

Provided is a microscope system including a microscope provided with a multi-channel image-acquisition unit that acquires images of a specimen at respective wavelengths; an adjustment-method storage portion that stores, for respective channels, contrast adjusting methods for the images acquired by the image-acquisition unit; and a contrast adjusting portion that adjusts, for the respective channels, contrasts of the images acquired by the image-acquisition unit based on the contrast adjusting methods stored in the adjustment-method storage portion.

5 Claims, 4 Drawing Sheets

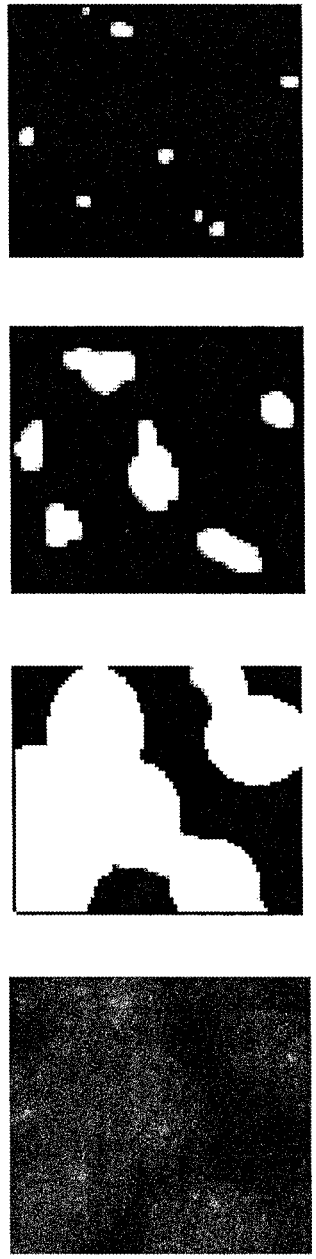

MICROSCOPE SYSTEM

CROSS-REFERENCE TO RELATED APPLICATIONS

This application is based on Japanese Patent Application No. 2013-246522, the contents of which are incorporated herein by reference.

TECHNICAL FIELD

The present invention relates to a microscope system.

BACKGROUND ART

In fluorescence observation performed by using a microscope, there is a known microscope system with which the black balance is corrected in order to improve the distinction between a specimen and portions in which the specimen does not exit (for example, see Patent Literature 1). With this microscope system, in accordance with the distance between the peak of low-luminance displacement points and the peak of high-luminance displacement points in a luminance histogram of an image, it is judged whether or not to remove a lower luminance side thereof, which corresponds to a background portion, and processing is performed accordingly.

For example, in FISH (Fluorescence In Situ Hybridization) observation, a detection target, namely, EML4-ALK, which is a gene responsible for lung cancer, is tagged with green (FITC) and red (TexRed) probes, and the presence/absence of translocations in the EML4-ALK gene is checked based on the proximity or separation between green signals and red signals. Therefore, it is not possible to improve the clarity of the observation subject by removing the lower luminance side that corresponds to the background portion, as in the case of Japanese Unexamined Patent Application, Publication No. 2010-98719, and, ideally, it is necessary to remove not only the background portion but also all signals other than relevant signals.

In particular, because an operator who performs FISH observation has to check signals for more than several hundred locations per day, it is not efficient for the operator to manually perform image manipulation each time a still-image is acquired.

CITATION LIST

Patent Literature

{PTL 1} Japanese Unexamined Patent Application, Publication No. 2010-98719

SUMMARY OF INVENTION

An aspect of the present invention is a microscope system including a microscope provided with a multi-channel image-acquisition unit that acquires images of a specimen at respective wavelengths; an adjustment-method storage portion that stores, for respective channels, contrast adjusting methods for the images acquired by the image-acquisition unit; and a contrast adjusting portion that adjusts, for the respective channels, the images acquired by the image-acquisition unit based on the contrast adjusting methods stored in the adjustment-method storage portion.

BRIEF DESCRIPTION OF DRAWINGS

FIG. 4A is an example image showing an original image, which shows a modification of the contrast adjusting method in FIG. 3.

FIG. 4B is an example image showing a binary image based on an average value, which shows a modification of the contrast adjusting method in FIG. 3.

FIG. 4C is an example image showing the process of increasing a threshold for binarization, which shows a modification of the contrast adjusting method in FIG. 3.

FIG. 4D is an example image showing a state in which a standard is met, which shows a modification of the contrast adjusting method in FIG. 3.

DESCRIPTION OF EMBODIMENT

A microscope system 1 according to an embodiment of the present invention will be described below with reference to the drawings.

Figure 1:
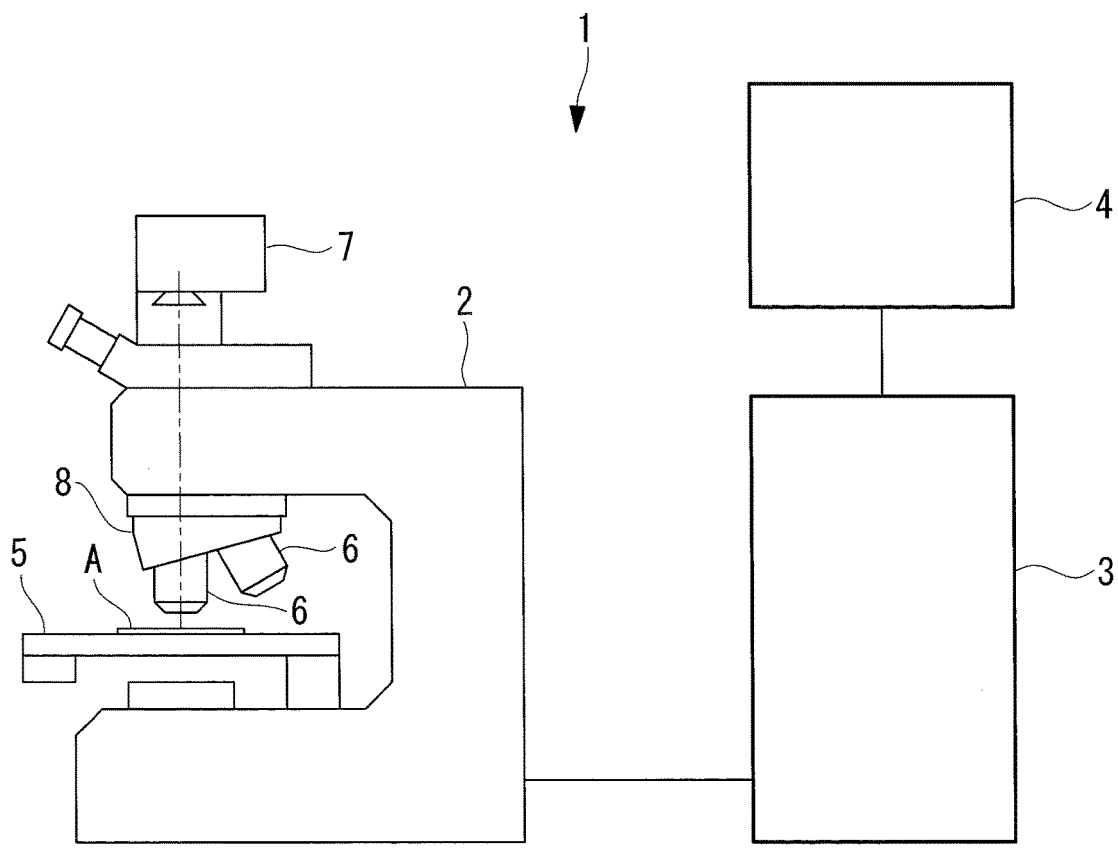
FIG. 1 is a diagram showing the overall configuration of a microscope system according to an embodiment of the present invention.

As shown in FIG. 1, the microscope system 1 according to this embodiment is provided with a microscope 2, a controller 3 that controls the microscope 2, and a monitor 4 that displays an image acquired by the microscope 2.

The microscope 2 is a general system microscope provided with a stage 5 on which a specimen A is placed, a microscope optical system including objective lenses 6 that are placed close to the specimen A, and a microscope digital camera (image-acquisition unit) 7 that captures light from that specimen A collected by the objective lenses 6. The digital camera 7 is provided with, for example, a color CCD (Charge Coupled Device) and is configured so that three types (three channels) of images, namely, images based on RGB (Red, Green, and Blue), can be acquired in accordance with the wavelength bands of light coming from the specimen A and so that the images can be output separately. In the figures, reference sign 8 indicates a revolver for switching among the objective lenses 6.

Figure 2:
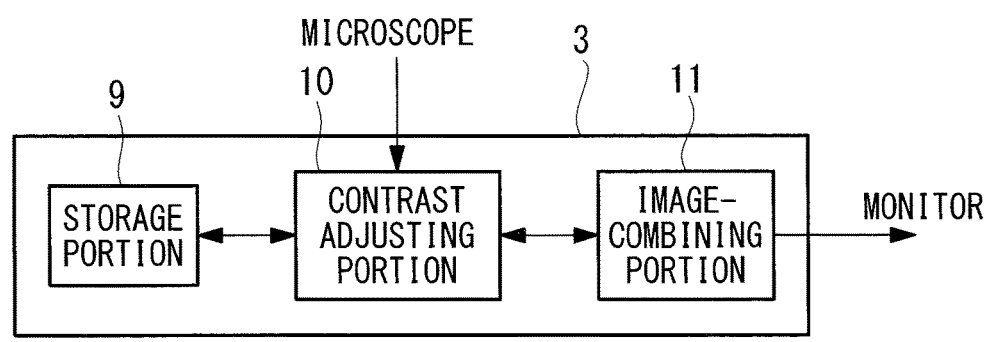
FIG. 2 is a block diagram showing a controller of the microscope system in FIG. 1.

As shown in FIG. 2, the controller 3 is provided with a storage portion 9 that stores contrast adjusting methods and a contrast adjusting portion 10 that adjusts, for the respective channels, the contrasts of images acquired by the microscope 2 by using the contrast adjusting methods stored in the storage portion 9. In this embodiment, the contrast adjusting methods for the respective channels are separately stored in the storage portion 9. The contrast adjusting portion 10 separately reads out images of the three channels output from the digital camera 7. At the same time, the contrast adjusting portion 10 reads out the contrast adjusting methods stored in association with the channels from the storage portion 9 and adjusts the contrast of the respective images.

In addition, the controller 3 is provided with an image-combining portion 11 that combines the images of the three channels whose contrasts have been adjusted by the contrast adjusting portion 10 and that outputs the combined image to the monitor 4.

Figure 3A:
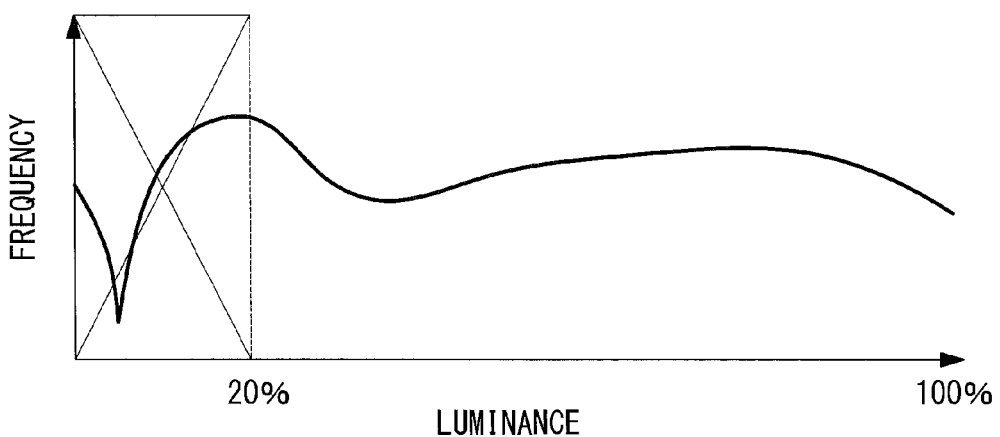
FIG. 3A is a luminance histogram for explaining contrast adjustment of a blue image, performed by a contrast adjusting portion of the controller in FIG. 1.
Figure 3B:
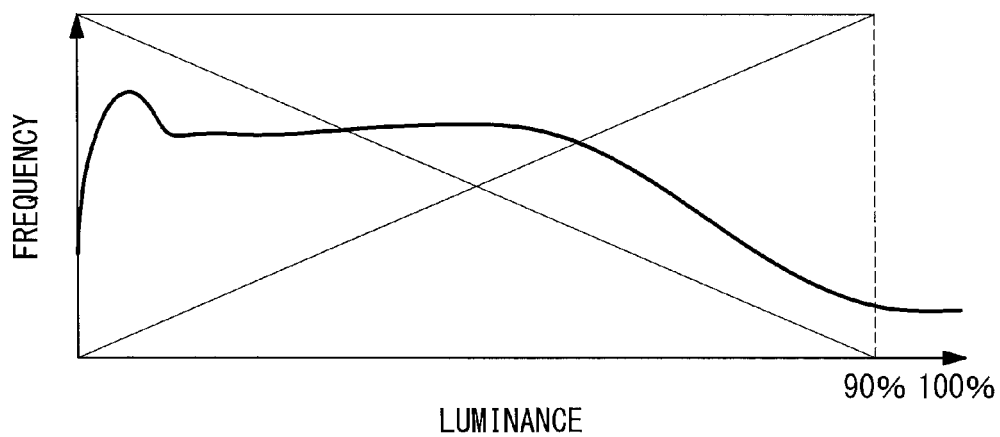
FIG. 3B is a luminance histogram for explaining contrast adjustment of a green image, performed by the contrast adjusting portion of the controller in FIG. 1.
Figure 3C:
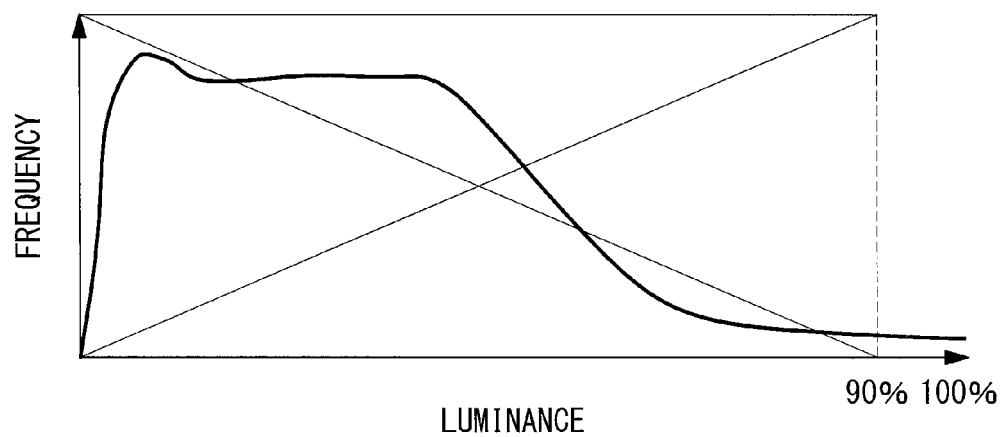
FIG. 3C is a luminance histogram for explaining contrast adjustment of a red image, performed by the contrast adjusting portion of the controller in FIG. 1.

The contrast adjusting methods stored in the storage portion 9 are, for example, methods in which luminance histograms are generated for images of the respective channels and portions of the luminance histograms are removed based on predetermined thresholds. For example, in the case of FISH observation, a predetermined threshold for blue images, at which a portion of the luminance histogram is removed, is set at 20% from the lower luminance side, as shown in FIG. 3A. As for green images, a threshold is set at 90% from the lower luminance side, as shown in FIG. 3B. As for red images, a threshold is set at 90% from the lower luminance side, as shown in FIG. 3C.

By setting the threshold for the blue images at 20%, noise in the background can be removed.

By setting the threshold for the green images at 90%, signals other than green signals can be removed.

By setting the threshold for the red images at 90%, signals other than red signals can be removed.

Furthermore, the contrast adjusting portion 10 is configured so as to expand the luminance distribution of each RGB image as a whole by replacing points that have been removed with a luminance of zero.

The image-combining portion 11 is configured to combine the three types of images that have been adjusted by the contrast adjusting portion 10.

With the thus-configured microscope system 1 according to this embodiment, once a color image of the specimen A is acquired by the microscope 2, the image is transmitted to the controller 3 in the form of images for the three channels, namely, the RGB channels, in accordance with the wavelength bands thereof. Upon receiving the images of the respective channels, the controller 3 reads out the contrast adjusting methods stored in the storage portion 9 in association with the respective channels, and the contrast for each channel is adjusted by the contrast adjusting portion 10.

The images for the three channels whose contrasts have individually been adjusted are combined and output to the monitor 4 after expanding the luminance distributions of the images as a whole at the image-combining portion 11 by setting the luminances of the points that have been removed to zero.

For example, when performing FISH observation for detecting translocations in the ALK gene, in order to judge whether or not to perform molecular targeted therapy on EML4 (Echinoderm Microtubule-associated protein Like protein 4)-ALK (Anaplastic Lymphoma Kinase), which is a gene responsible for lung cancer, the ALK gene in the specimen A is tagged by using green (FITC (Fluorescein Isothiocyanate)) and red (TexRed) probes.

Therefore, by individually removing 90% of the green image and the red image from the lower luminance side, only relevant signals are left in the green image and the red image while removing the rest of the signals. By removing 20% of the blue image from the lower luminance side, it is possible to remove noise in the background and to leave the outline of the specimen A clearly.

By doing so, in the case in which an operator sees yellow signals that are created when the green signals and the red signals are close to each other or overlap with each other, he/she can observe the absence of a translocation in the ALK gene in a simple manner with high precision. In addition, by confirming that the green signals and the red signals are separated, it is possible to observe the presence of a translocation in the ALK gene in a simple manner with high precision.

Because signals other than the relevant signals are removed from the green image and the red image, the operator can immediately recognize yellow spots displayed on the monitor 4 as sites at which translocations in the ALK gene do not exist, and he/she can immediately recognize green and red spots as sites at which translocations in the ALK gene exist. Accordingly, there is an advantage in that the efficiency of checking signals is enhanced by simplifying the work of the operator so that just the colors of spots in the images need to be checked.

Note that, in this embodiment, although the predetermined thresholds for removing portions of the luminance histograms are set at 20% from the lower luminance side for blue images, 90% from the lower luminance side for green images, and 90% from the lower luminance side for red images, they are not limited thereto, and the thresholds can be set to any other values.

Although thresholds are separately set for images of all channels, and the lower luminance sides are removed from these images, alternatively, contrast adjustments of the green image and the red image may be performed in accordance with luminance distributions.

As shown in FIGS. 4A and 4B, in the contrast adjustment in this case, for example, the original images for the respective channels are binarized by using average luminance values as binarization thresholds. Also, as shown in FIGS. 4C and 4D, these contrast adjustments are performed by increasing the binarization thresholds until a predetermined condition is met and, when the condition is met, by setting luminances of pixels in the original images that have luminances equal to or less than the binarization thresholds to zero.

Here, the predetermined condition refers to, for example, a situation in which the proportion of pixels having relevant signals in the entire image is equal to or less than a predetermined value. It is possible to arbitrarily set this predetermined value.

Alternatively, the condition may be set with reference to a situation in which a maximum area of pixel regions having the relevant signals is equal to or less than a predetermined value.

Figure 5:
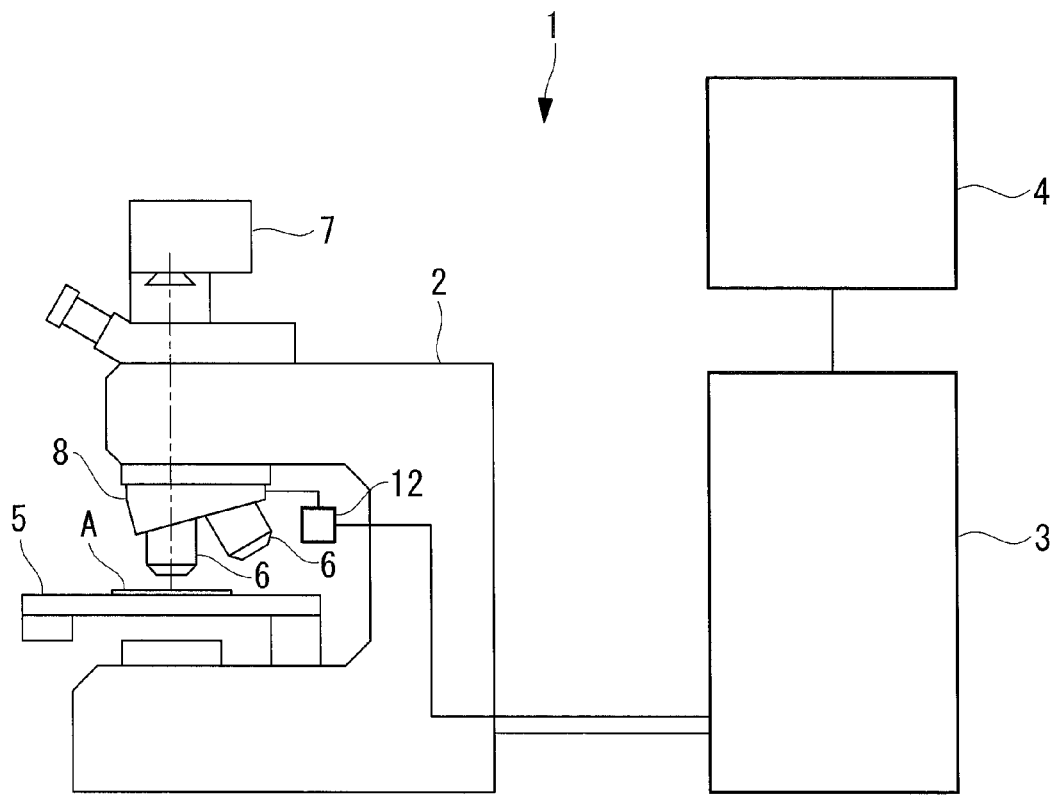
FIG. 5 is a diagram showing a modification of the microscope system in FIG. 1.

In this case, the size of an observation subject specified by the operator is acquired (from a list that is stored in advance or based on direct inputs by the operator), states of the microscope (for example, the magnification of the objective lens, the magnification of a camera adaptor, the magnification of an intermediate variable-magnification optical system, the size of a CCD in the camera, and so forth) are read by a microscope-setting reading portion 12, as shown in FIG. 5, and the actual field of view on the monitor 4 is calculated , thereby making it possible to calculate a maximum area of the pixel regions having the relevant signals on the monitor 4.

Examples of the microscope-setting reading portion 12 include a sensor or the like that is provided in the revolver 8 and that reads the model of a selected objective lens 6. In this case, models and magnifications of the objective lenses 6 should be stored, and the magnification should be read out based on the read model of the objective lens 6.

It is possible to calculate the actual field of view on the monitor 4 by using the following calculation formula.

Actual field of view when performing monitor observation=(CCD size/($M_{ob} \times M_{TV}$))

Here, the actual field of view when performing monitor observation is calculated as the value of a longer side.

The CCD sizes are stored in association with the CCD models.

$M_{ob}$ is the magnification of the objective lens 6× magnification of an intermediate variable-magnification optical system and, $M_{TV}$ is the projection magnification of a TV (Television) adaptor.

Figure 6:
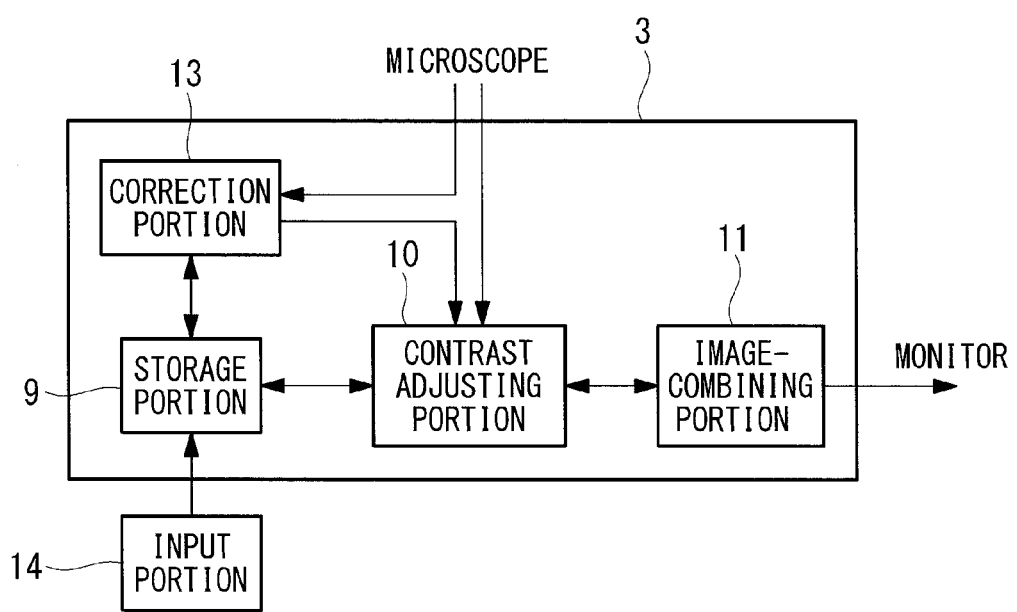
FIG. 6 is a block diagram showing a controller of the microscope system in FIG. 5.

In this case, as shown in FIG. 6, the controller 3 is provided with a correction portion 13 that reads out and corrects the contrast adjusting methods stored in the storage portion 9 based on the settings of the microscope 2 read by the microscope-setting reading portion 12 and that inputs the contrast adjusting methods to the contrast adjusting portion 10.

By doing so, even when the settings of the microscope 2 are changed, the contrast adjusting methods are corrected by the correction portion 13 based on the settings of the microscope 2 read by the microscope-setting reading portion 12.

The binarization thresholds that meet the condition may be stored in association with the positions of the stage 5 on which the specimen A is placed, and a binarization threshold corresponding to a position that best approximates the position of the stage 5 may be used when binarizing an image. By doing so, it is possible to set an appropriate binarization threshold with less time as compared with the case in which the binarization threshold is calculated every time.

Whether or not to perform contrast adjustment may automatically be judged by the microscope system 1.

For example, the automatic judgment may be made based on whether or not images for the three channels, namely, RGB, are being acquired or whether or not the settings of the individual channels satisfy the conditions for FISH observation.

Although this embodiment has been described by using FISH observation as an example, it is not limited thereto.

In the case in which there are a plurality of observation methods, contrast adjusting methods may be stored for the respective observation methods, and a switching portion (correction portion) that switches among the contrast adjusting methods in accordance with the observation methods may be provided.

Although the contrast adjusting methods are stored in the storage portion 9, an input portion (adjustment-method input portion) 14 may be provided, as shown in FIG. 6, so that the operator can update the contrast adjusting method or input a new one.

The above-described embodiment is derived from individual aspects of the present invention described below.

An aspect of the present invention is a microscope system including a microscope provided with a multi-channel image-acquisition unit that acquires images of a specimen at respective wavelengths; an adjustment-method storage portion that stores, for respective channels, the contrast adjusting methods for the images acquired by the image-acquisition unit; and a contrast adjusting portion that adjusts, for the respective channels, the images acquired by the image-acquisition unit based on the contrast adjusting methods stored in the adjustment-method storage portion.

With this aspect, the contrasts of the images of the specimen acquired by the image-acquisition unit of the microscope at respective wavelengths are adjusted by the contrast adjusting portion. Because the contrast adjusting portion adjusts the contrasts of the images based on the contrast adjusting methods stored in the adjustment-method storage portion for the respective channels, the operator does not need to manually perform the image manipulation for the respective channels, and the observation efficiency can be enhanced by simplifying the work performed by the operator.

For example, even in observation like FISH observation in which signal checking is necessary, it is possible to easily remove not only the background portion but also signals other than the relevant signals based on the contrast adjusting methods stored for the respective channels, and thus, it is possible to obtain a high-contrast image.

The above-described aspect may be provided with a microscope-setting reading portion that reads a setting of the microscope; and a correction portion that corrects the contrast adjusting methods stored in the adjustment-method storage portion based on the setting of the microscope read by the microscope-setting reading portion.

By doing so, even when the setting of the microscope is changed, the contrast adjusting methods are corrected by the correction portion based on the setting of the microscope read by the microscope-setting reading portion. By doing so, the contrast of the image can be adjusted in an appropriate manner with respect to the setting of the microscope by using the corrected the contrast adjusting methods.

In the above-described aspect, the microscope may include an objective lens, and the setting of the microscope may include a magnification of the objective lens.

By doing so, when the magnification of the objective lens is changed, the changed magnification is read by the microscope-setting reading portion, and the contrast adjusting methods are corrected based on the read magnification. Accordingly, the contrast of the image can be adjusted in an appropriate manner with respect to the magnification of the objective lens by using the corrected contrast adjusting methods.

The above-described aspect may be provided with an adjustment-method input portion with which it is possible to input the contrast adjusting methods to be stored in the adjustment-method storage portion.

By doing so, the operator can input a desired contrast adjusting method by using the adjustment-method input portion, and contrast-adjusted images can be obtained in accordance with the preferences of the operator.

REFERENCE SIGNS LIST 1 microscope system
2 microscope
6 objective lens
7 digital camera (image-acquisition unit)
9 storage portion (adjustment-method storage portion)
10 contrast adjusting portion
12 microscope-setting reading portion
13 correction portion
14 input portion (adjustment-method input portion)

The invention claimed is:
1. A microscope system comprising:
a microscope comprising a multi-channel image-acquisition sensor configured to acquire images of a specimen at a plurality of channels of respective wavelengths; and
a controller configured to:

read, for respective channels, contrast adjusting methods for the images acquired by the multi-channel image-acquisition sensor;

generate data representing luminance histograms for the respective images acquired by the multi-channel image-acquisition sensor; and process the generated data to remove lower luminance sides of the respective luminance histograms in which luminance is equal to or less than predetermined thresholds separately set for the plurality of channels based on the contrast adjusting methods read, to thereby adjust contrasts of the images acquired by the multi-channel image-acquisition sensor.

2. The microscope system according to claim 1, further comprising:

a microscope-setting reading sensor configured to read a setting of the microscope, wherein the controller is configured to correct the contrast adjusting methods based on the setting of the microscope read by the microscope-setting reading sensor.

3. The microscope system according to claim 2, wherein the microscope further comprises an objective lens, and wherein the setting of the microscope comprises a magnification of the objective lens.

4. The microscope system according to claim 1, further comprising:

an adjustment-method input device configured to receive input of the contrast adjusting methods to be read by the controller.

5. The microscope system according to claim 1, wherein the controller is configured to:

combine the images whose contrasts have been adjusted to thereby generate a combined image; and control a display to display the combined image.

* * * * *